UNITED STATES PATENT OFFICE.

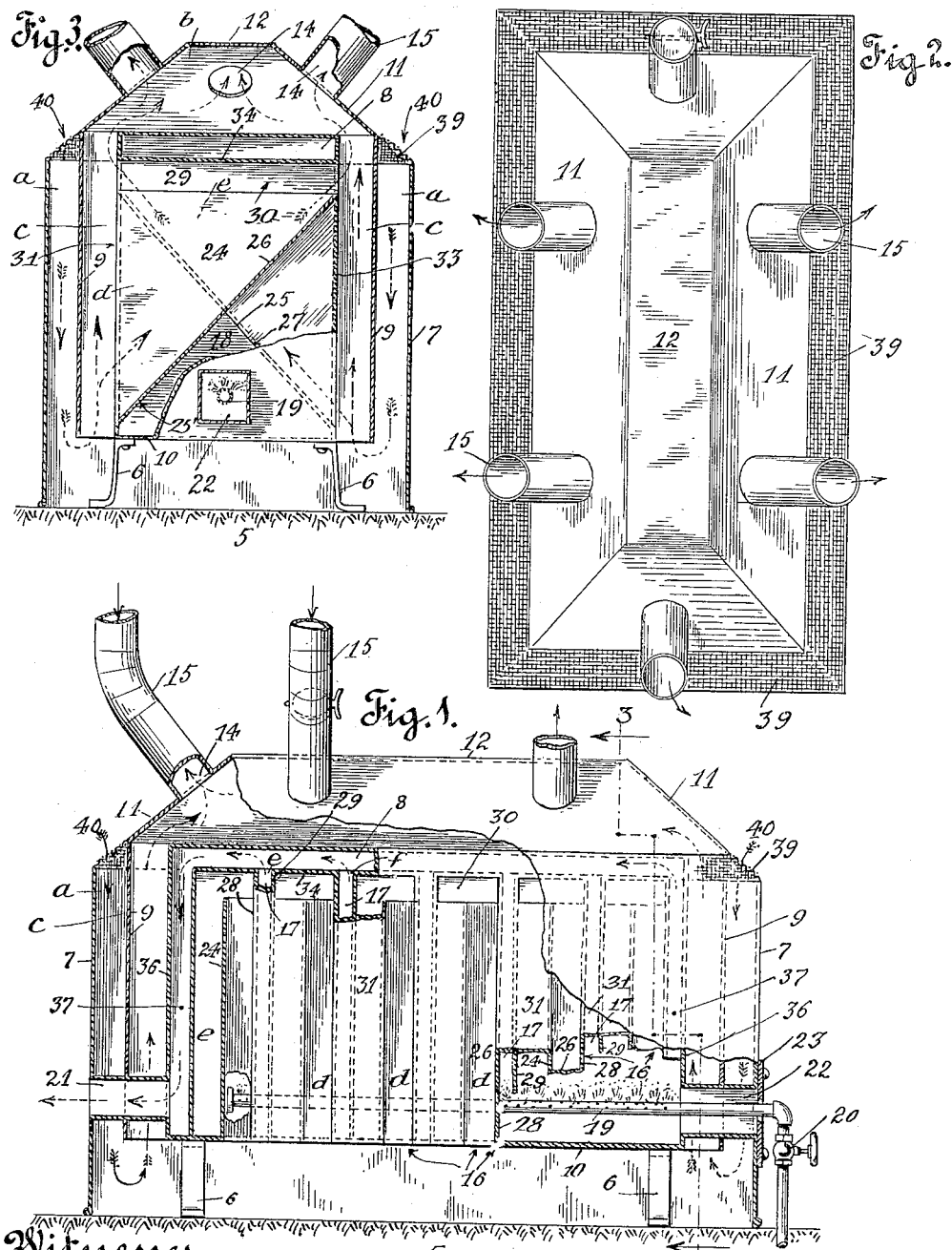

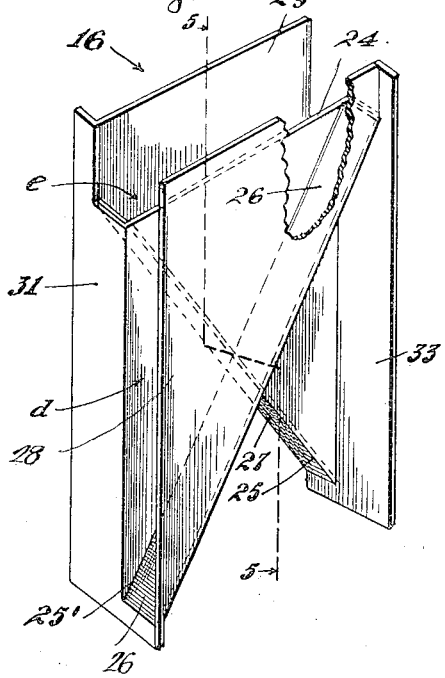
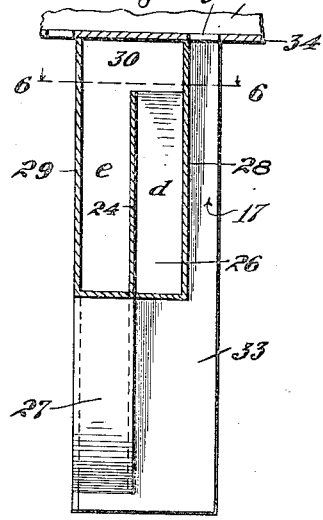
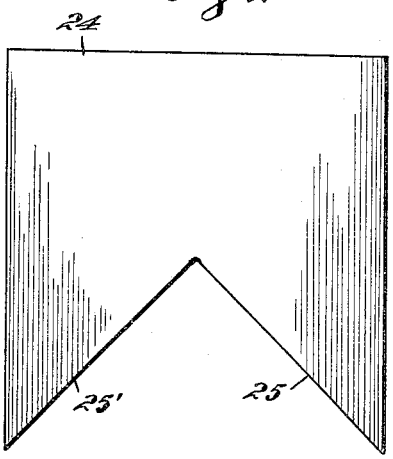
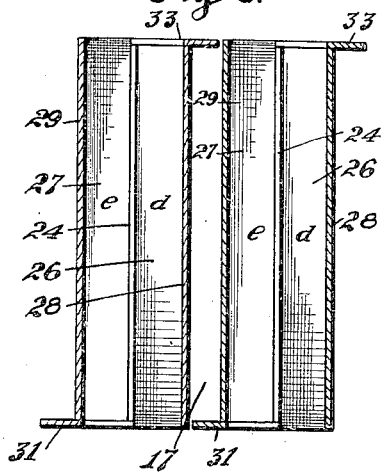

RAYMOND H. VONDENBOSCH, OF LOS ANGELES, CALIFORNIA, ASSIGNOR TO THE CENTRAL HARDWARE COMPANY, OF LOS ANGELES, CALIFORNIA, A CORPORATION OF CALIFORNIA.

HOT-AIR FURNACE.

1,131,576.     Specification of Letters Patent.     Patented Mar. 9, 1915.

Application filed January 27, 1913. Serial No. 744,407.

*To all whom it may concern:*

Be it known that I, RAYMOND H. VONDENBOSCH, a citizen of the United States, residing at Los Angeles, in the county of Los Angeles and State of California, have invented a new and useful Improvement in Hot-Air Furnaces, of which the following is a specification.

This invention relates to hot air furnaces and more especially to furnaces built up of sections, and the principal object is to provide an efficient hot air furnace which embodies a series of complementary heat radiating units adapted to be assembled in various numbers according to the heating capacity desired, and to produce a heat radiating unit having a large radiating area in proportion to the space occupied.

It is also an object to provide a hot air furnace provided with an intake entirely around the furnace so that the unheated air comes in contact with the casing usually acting as an external casing in an ordinary furnace so that the heat is absorbed entirely from this surface and not wasted.

It is a further object to provide a heating unit having a plurality of heating chambers which cross or intersect one another and straddle the burner supplying the flame, the intermediate chambers formed between these unites carrying off the products of combustion to a suitable discharge flue.

In the drawings accompanying this specification and forming therewith the application for Letters Patent Figure 1 is a side elevation of a furnace composed of a number of heating units, the walls composing the structure being partly broken away, the screen not being continued clear across the side so that the arrows indicating the direction of the currents of air will clearly show. Fig. 2 is a plan view viewed from the top. Fig. 3 is a section on the line 3—3 of Fig. 1, passing in succession through the upper dome chamber, one of the heating elements and through the fuel passage entering into the combustion chamber. Fig. 4 is a perspective view of one of the heat radiating units with portions broken away. Fig. 5 is a vertical section on the line 5—5 of Fig. 4, showing a portion of the flue. Fig. 6 is a horizontal section on the line 6—6 of Fig. 5, showing a pair of the heat radiating units disposed in their operative relation to each other. Fig. 7 is a view in elevation of the intermediate wall of the heat radiating unit.

In the operation of furnaces, to supply the same with gas where the latter is relatively cheaper as a fuel, and the periods of low temperature are not continuous, difficulty in heating up large areas by this means has increased the cost considerably, and the results have been poor.

This invention overcomes the above difficulties in supplying a furnace in which the parts are small in capacity considering their efficiency, and are brought in close contact with the flame from the gas burner, and are composed of sections to which others are easily connected to build either a small size or large size furnace depending on the amount of heating required.

In the drawings, 5 indicates the floor or surface upon which the furnace rests; the furnace proper being supported on legs 6, off of the ground and surrounded by a rectangular inclosing casing 7 which rests on the floor 5 and extends upward to the plane of a horizontally disposed flue 8 arranged at a suitable distance above the floor 5.

A metallic partition wall 9 extends parallel with the side and end walls of the casing 7 and is spaced a short distance therefrom to form a continuous air inlet passage *a* entirely around the interior of the inclosing casing 7. The partition 9 terminates at its lower end flush with the floor 10 of the combustion chamber which floor is spaced a short distance above the floor 5 and is supported on the legs 6; the upper end of the partition terminating a short distance above the casing 7 and joined to the inclined top 11 which connects with the edges of a horizontally disposed rectangular plate 12. The plates 11 and 12 form a pyramidal dome and inclose a space *b* above the horizontal flue 8, which space communicates with a space formed by the vertical walls of the partition 9 and the vertical walls of the radiating units 16. The top plates 11 are formed with suitable openings 14 which communicate with hot air conveying pipes 15 leading to suitable points of discharge.

Supported on the floor 10 of the furnace are the heat radiating units 16 which are connected at their upper ends to the under side 34 of the horizontal flue 8. The radiating units 16 are so constructed, as will later be described, that a vertical channel or passage 17 will be formed between the adjacent units the full interior width thereof and which passage opens at its upper end to the interior of the flue 8 and communicates at its lower end with the combustion chamber 18 above the plate 10; the top and side walls of the combustion chamber 18 being formed by the units 16. The passages 17 form vertical flues for the passage of the products of combustion and hot gases from the combustion chamber 18 to the horizontal flue 8.

This furnace is primarily designed for the burning of gas, for which reason the combustion chamber 18 is provided with a burner 19 to which the fuel gas is delivered from any suitable source and controlled by a valve 20; it being manifest, however, that any suitable fuel may be employed as desired.

The discharge end of the flue 8 leads downward at the rearward termination of the assembled units 16 and communicates with an exhaust flue 21 leading to the exterior of the casing 7, which exhaust flue opens directly to the room in which the furnace is located as shown, or is connected to a suitable chimney as desired. An air intake flue 22 provided with a door 23 leads from the exterior of the casing 7 at the forward end thereof to the combustion chamber 18; this air intake flue 22 being disposed opposite the exhaust flue 21. The burner pipe 19 enters the combustion chamber through the air intake flue 22.

The heating units 16 are formed as particularly shown in Fig. 4, being preferably constructed of sheet metal, and comprise a vertical intermediate plate 24 of general rectangular shape with a triangular section cut out of its lower edge to form oppositely inclined edges 25 and 25'. Secured to opposite sides of the plate 24 and extending at right angles thereto are narrow inclined plates 26 and 27 which plates extend diagonally in opposite directions from the upper corners of the plate 24 downward to the opposite lower corner; the plate 26 being attached to the edge 25' and the plate 27 attached to the edge 25. The plates 26 and 27 are joined at their outer edges to the lower edges of the vertically disposed triangular shaped plates 28 and 29, respectively. The outer plates 28 and 29 parallel the central plate 24 and extend upwardly a short distance above the upper edge of the latter so as to form oppositely extending or crossed triangular shaped passages $d$ and $e$ above the plates 26 and 27, which passages open along their vertical edges to the passages $c$. When a unit is placed in position, and the upper edges of the plates 28 and 29 connected with the under side 34 of the flue 8, the upper edge of the plate 24 will be disposed a short distance below the flue 8, thus forming a horizontal passage or channel 30 communicating with the triangular shaped passages $d$ and $e$ on opposite sides of the plate 24 and extending transversely beneath the flue 8 and opening to the space $c$ immediately inside of the partition 9.

Secured to the vertical edges of the plate 24 are oppositely extending side-wall plates 31 and 33. The plate 31 extends opposite the plate 27 and projects a short distance beyond the plate 29 with its outer edge parallel with the latter. In like manner the plate 33 extends opposite the plate 26 and projects beyond the outer face of the plate 28. The portions of the plates 31 and 33 projecting beyond the plates 28 and 29 are carried up to the full height of the latter plates and are joined to the vertical side walls of the flue 8. By this construction when a series of the radiating units are brought together the outer edges of the side-wall plates will abut against the lateral plates 28 and 29 of the adjacent units, thereby forming the passages 17 as before specified; each of the passages 17 registering with one of a series of transverse openings $f$ in the lower wall 34 of the flue 8 so that a vertical products of combustion passage 17 will be formed between each of the adjacent units 16. It will be noted that the inclined plates 26 and 27 form the roof or top of the combustion chamber 18 intermediate the passages 17 against which the hot gases generated in the combustion chamber 18 will be impinged. The plates 26 and 27 also form the bottoms of the triangular shaped passages $d$ and $e$ which lead alternately from one side of the furnace to the other above the combustion chamber. The vertical side-wall plates 31 and 33 form the sides of the combustion chamber between the plates 28 and 29, and also form sides of the passages $c$ between the open ends of the triangular passages $d$ and $e$.

From the foregoing it will be seen that each unit will have heat radiating surfaces throughout the areas of the intermediate plate 24; the inclined plates 26 and 27; transverse plates 28 and 29, and the end plates 31 and 33 and that additional heat radiating surface is obtained around the flue 8 and the partition 9.

At each end of the series of units 16 a pair of spaced end plates 36 and 37 are added so as to complete the end units and at the same time form the passage communicating between the forward end of the combustion chamber 18 and the flue 8 and the vertical passage leading from the back end of the flue 8 down to the exhaust flue 21.

The space between the upper ends of the casing 7 and the partition 9 is open to form a fresh air inlet to the furnace, this space being covered by a screen 39 to prevent the entrance of foreign matter; this opening being high above the floor 5 so as to necessitate the passage of the air downward around the partition 9.

In the operation of the invention heat is generated in the combustion chamber 18 by means of the burner 19, or in any other suitable manner; the products of combustion and hot gases passing upward through the passages 17 between the adjacent plates 28 and 29 of the heating units 16 and against the inclined plates 26 and 27 and side-wall plates 31 and 33, thereby heating the entire structure of each heating unit. The hot gases pass from the passages 17 into the horizontal flue 8 and are then discharged through the flue 21; the hot gases in passing through the flue 8 acting to heat the walls of the latter. The hot gases or products of combustion will be confined to the passages just described and will not enter the space between the heating units and the inclosing walls of the furnace. The air to be heated enters the space or passage $a$ between the partition 9 and the casing 7 through the screen 39, as indicated by the arrows 40, and passes down in contact with the exterior surface of the partition 9 where it is superheated by heat radiating from the latter. The air then passes under the lower edge of the partition 9, thence upwardly along its inner walls and through the space or passage $c$ formed at the ends of the heating units. The air current will divide in this space or passage $c$ so that a portion will pass through the triangular passages $d$ and $e$ over the plates 26 and 27 across to the opposite side of the furnace, thence around the sides of the flue 8 and into the space $b$ in the pyramidal dome of the furnace from whence it is discharged through the conduits 15. The air thus coming into contact with the many heated surfaces of the radiating units will become highly heated by the radiation therefrom.

Increased efficiency of the furnace is obtained by superheating the air before admitting it to the radiating units, which prevents the radiators from being excessively cooled by an influx of cold air, thereby requiring less fuel to maintain the radiator at a uniform temperature.

What I claim is:

1. An air heating furnace, comprising a combustion chamber, a horizontal flue arranged above the combustion chamber, a plurality of heat radiating units interposed between the combustion chamber and the flue, said units forming the sides and top of the combustion chamber, and formed with vertically disposed triangular shaped passages open at their vertical side and top and with adjacent passages oppositely disposed in relation to each other so as to direct the currents of air from opposite sides of the radiators against the bottom and around the sides of the flue, a hot air chamber above the flue having discharge outlets, walls forming a vertical air passage surrounding the radiators and communicating with said hot air chamber and with the triangular passages, and walls forming a superheating air passage surrounding said vertical passage and connecting with the latter at its lower end and having an air intake opening at the top of the exterior passage.

2. An air heater, comprising an exterior casing, a partition paralleling the side and end walls of said casing and forming an air passage open at its top, said air passage communicating with the space inside of the partition at its bottom, a dome covering the space inclosed by the partition and forming a hot air space, a horizontally extending flue within the dome on a plane at the top of the partition, a series of heat radiators connected to the under side of said flue forming the top and sides of a combustion chamber, a floor forming the bottom of said combustion chamber on which said radiators are supported, vertical flues formed by the radiators and leading from the combustion chamber to the flue, and a series of vertical oppositely disposed triangular passages formed in the radiators between said flues, said passages opening to the space inclosed by the partition and adapted to direct air against the under side of the horizontal flue and to the hot air space from opposite sides of the radiators.

3. In a heater, a radiator unit, comprising an intermediate plate, oppositely disposed inclined plates on the opposite sides of the intermediate plate at right angles thereto, said intermediate plate being cut away below the angle of intersection of said inclined plates, vertically extending plates joined to the outer edges of the inclined plates, and oppositely extending side-wall plates affixed to the vertical edges of the intermediate plate and projecting beyond the outer faces of the vertically extending plates and adapted to abut against the vertical plates of adjacent complementary radiator units.

4. In an air heater, a radiator unit, comprising a vertical intermediate rectangular plate, an inclined plate on each side of the intermediate plate at right angles thereto extending diagonally from the opposite upper corners of said intermediate plate to its lower corners, outer plates joined to the edges of the inclined plates extending upward parallel with the intermediate plate and projecting a short distance above the upper edge of the latter, and oppositely extending side plates on the vertical edges of the intermediate plate extending beyond the outer plates and adapted to abut against the outer plates of adjacent radiator units to form vertical passages between adjacent units.

5. In an air heater, a plurality of radiator units, each of said radiators comprising a central vertically disposed rectangular plate, inclined rectangular plates on opposite sides of said central plate extending diagonally from the opposite upper corner of said plate to its lower corners, said central plate being cut away below the point of crossing of said diagonal plates, outer plates joined on the outer edges of the diagonal plates and forming triangular shaped passages above the diagonal plates leading from one side of the radiator to the other, said outer plates extending above the central plate to form communication between the passages on opposite sides of said central plate, and side-wall plates affixed to the vertical edges of the central plate and extending in opposite directions and projecting beyond the outer plates so as to form open ended vertical passages between adjacent radiator units.

6. In an air heater, a plurality of radiators, each of said radiators comprising a central vertically disposed rectangular plate, rectangular plates on opposite sides of said central plate extending diagonally from the opposite upper corners of said plate to its lower corners, said central plate being cut away below the point of crossing of said diagonal plates, outer plates joined on the outer edges of the diagonal plates and forming triangular shaped passages above the diagonal plates leading from one side of the radiator to the other, said outer plates extending above the central plate to form communication between the passages on opposite sides of said central plate, side-wall plates affixed to the vertical edges of the central plates and extending in opposite directions and projecting beyond the outer plates so as to form open ended vertical passages between adjacent radiators, a horizontal plate supporting said radiator units forming the bottom of a combustion chamber of which the side and top walls are formed by the radiators, and a horizontally extending flue connected to the upper ends of the radiators and communicating with the vertical passages therebetween.

7. In an air heater, a plurality of radiators, each of said radiators comprising a central vertically disposed rectangular plate, rectangular plates on opposite sides of said central plate extending diagonally from the opposite upper corners of said plate to its lower corners, said central plate being cut away below the point of crossing of said diagonal plates, outer plates joined on the outer edges of the diagonal plates and forming triangular shaped passages above the diagonal plates leading from one side of the radiator to the other, said outer plates extending above the central plate to form communication between the passages on opposite sides of said central plate, side-wall plates affixed to the vertical edges of the central plate and extending in opposite directions and projecting beyond the outer plates so as to form open ended vertical passages between adjacent radiators, a horizontal plate supporting said radiator units and forming the bottom of a combustion chamber of which the side and top walls are formed by the radiator units, a horizontally extending flue connected to the upper ends of the radiators and communicating with the vertical passages therebetween, a housing inclosing said radiators and flue and spaced therefrom, and means for admitting air to the space between the radiators and housing at a point near the bottom of said housing, and means for discharging the air from the housing above the flue.

In witness that I claim the foregoing I have hereunto subscribed my name this 10th day of January, 1913.

RAYMOND H. VONDENBOSCH.

Witnesses:
   W. P. KEENE,
   EDMUND A. STRAUSE.

Copies of this patent may be obtained for five cents each, by addressing the "Commissioner of Patents Washington, D. C."